United States Patent [19]

Neefe

[11] Patent Number: 4,659,524
[45] Date of Patent: Apr. 21, 1987

[54] METHOD OF MOLDING BIFOCAL CONTACT LENSES

[76] Inventor: Charles W. Neefe, 811 Scurrys St., P.O. Box 429, Big Spring, Tex. 79720

[21] Appl. No.: 769,678

[22] Filed: Aug. 27, 1985

Related U.S. Application Data

[63] Continuation-in-part of Ser. No. 710,983, Mar. 12, 1985, abandoned.

[51] Int. Cl.⁴ ............................................. B29D 11/00
[52] U.S. Cl. ..................... 264/2.5; 264/2.6; 264/2.7; 425/808
[58] Field of Search ............. 264/2.5, 2.7, 2.6; 425/808; 351/161

[56] References Cited

U.S. PATENT DOCUMENTS 4,247,492 1/1981 Neefe .................. 425/808
4,279,401 7/1981 Ramirez ............... 425/808

FOREIGN PATENT DOCUMENTS 143316 8/1983 Japan ..................... 351/161

Primary Examiner—James Lowe

[57] ABSTRACT

A reproducible soft bifocal contact lens having a crescent shaped segment made by cast molding. A convex metal mold having the required two optical radii and prism is made from steel or brass. A negative replica of the convex metal mold is made from a heated and softened resinous material. The resinous concave negative mirror image made by compression or injection molding. The concave resinous mold is placed in a rubber sleeve and the liquid lens monomer is cast in the concave mold and allowed to polymerize. A concave optical surface is cut and polished on the solid lens material. The finished hard xerogel lens is removed from the concave resinous mold and hydrated to form the soft hydrogel bifocal lens.

17 Claims, 8 Drawing Figures

METHOD OF MOLDING BIFOCAL CONTACT LENSES

This is a continuation in part of application Ser. No. 710,983, filed 03/12/85 entitled; "METHOD OF MAKING BIFOCAL CONTACT LENSES" and now abandoned.

BACKGROUND OF THE INVENTION

The use of plastic materials for making optical lenses has increased rapidly for the past ten years. This is due to the availability of better plastic materials and the physical advantages of the plastic resins for specific applications such as contact lenses. The technology for the production of high quality contact lenses has not kept pace with the material supply industry. It is important to advance both areas if the full potential is to be realized.

The current bifocal contact lenses are fabricated from plastic or glass, each lens is individually ground and polished to the required specifications. To achieve accurate reproduction of bifocals is most difficult and expensive. This new process makes possible exact reproductions and has many other distinct advantages which will become apparent from the following disclosure.

An object is to provide a process for making inexpensive bifocal contact lenses which may be made to identical specifications.

PRIOR ART

U.S. Pat. Nos. 4,239,712 Dec. 15, 1980 and 4,202,848 May 13, 1980 disclose lenses having a crescent shaped reading segment cut and polished on the front surface. In these patents, methods are disclosed wherein the reading segment is cut into the distance segment. U.S. Pat. Nos. 4,524,035, 3,440,306, 3,560,598 and 3,597,055 disclose methods of making fused crescent bifocals having two materials of different refractive index.

IN THE DRAWINGS

THE LENSES ARE MADE AS FOLLOWS

Figure 1:
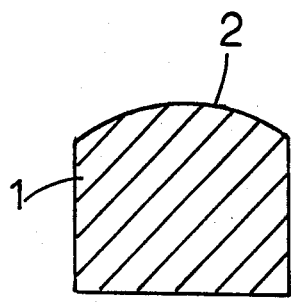
FIG. 1 shows the metal mold in section.
Figure 2:
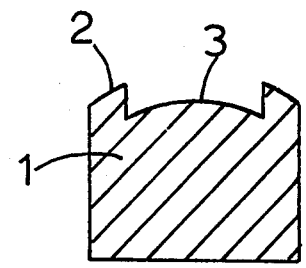
FIG. 2 shows the metal mold with the reading segment cut, in section.
Figure 3:
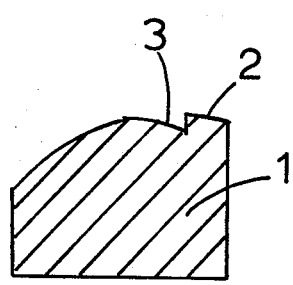
FIG. 3 shows the metal mold with the reading and distant segments cut, in section.
Figure 7:
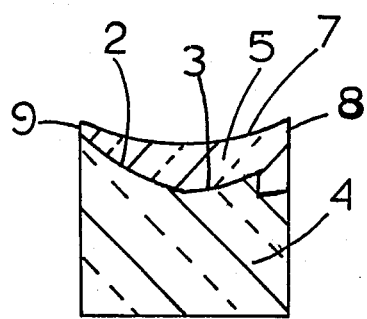
FIG. 7 shows the negative resinous mold and the bifocal lens with the concave surface cut, in section.

The convex mold surface 2 FIGS. 1 and 2 is rough cut to a non-optical surface to remove surplus metal stock from the mold 1 FIGS. 1 and 2. The shorter convex radius reading segment 3 FIG. 2 is cut into the convex surface 2 FIG. 2 and polished to provide an optical surface having the required radius and the required thickness. The reading optical surface 3 FIG. 2 may have no prism with the optical center located at the geometric center or the optical center may be displaced from the geometric center. The location of the optical center will have the affect of changing the shape of the upper segment demarcation line. A further separation of the optical centers of the reading segment and the distant segment results in a longer radius of the upper segment demarcation line. The distant segment 2 FIG. 3 is cut and polished having the optical centers of the near and distant segments displaced one from the other to provide a difference of from 0.25 to 3.5 diopters of prism refractive power. A prism diopter is defined as an image displacement of one centimeter at a distance of one meter. The prism base or thicker edge 8 FIG. 7 is located at the lower lens edge at the midway point of the reading segment. The thin apex 9 FIG. 7 of the prism is located at the upper lens edge, 180° removed from the prism base 8 FIG. 7. Smaller amounts of prism result in thinner lenses having a longer segment arc. Larger amounts of prism or greater differences in edge thickness result in a shorter segment arc. The optical distant convex surface 2 FIG. 3 is cut and polished by methods well known to the art. No special cover or protection is required for the convex reading segment 3 FIG. 3 as the polishing lap is well supported by the distant surface 2 FIG. 3 and no distortion of the near segment will occur while polishing the distant surface. The reading surface 3 FIG. 3 is well below the distant surface 2 FIG. 3 and therefore requires no cover or protection. A hard polishing lap is used therefore filling of the segment is not required. It is understood that the process may be reversed and the distant lens power made without prism or offset and the reading segment 3 FIG. 2 is cut with prism or the combination of prism in both distant or near segments may be employed to control the segment shape.

Figure 4:
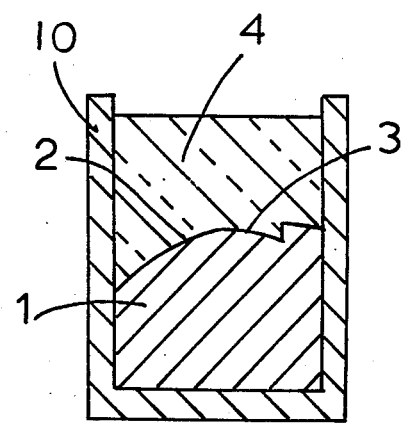
FIG. 4 shows the mold with the resin negative mold in place, in section.

The metal mold 1 FIG. 3 is placed in a metal cylinder 10 FIG. 4. The convex mold 1 FIG. 4 having the crescent shaped reading segment 3 FIG. 4 surrounded by the distant mold segment 2 FIG. 4 is covered with a heated and softened resin material 4 FIG. 4. Pressure is applied either by compression molding or injection molding. The resin material is allowed to assume the shape of the mold surface 2 and 3 FIG. 4 and the inside of the cylinder 10 FIG. 4. The plastic heated resin is allowed to cool and become solid. The following resinous materials have been found useful: nylon, polypropylene, polyvinylchloride and polyethylene. The metal molds have been made from brass and stainless steel. The cool concave resinous mold 4 FIG. 4 is removed from the convex metal mold 1 FIG. 4.

Figure 5:
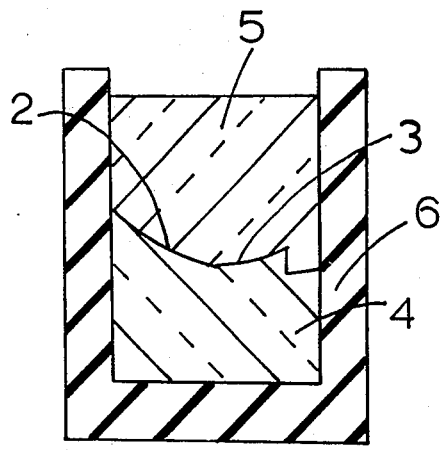
FIG. 5 shows the negative resin mold in the silicone sleeve and the bifocal lens monomer in place, in section.
Figure 6:
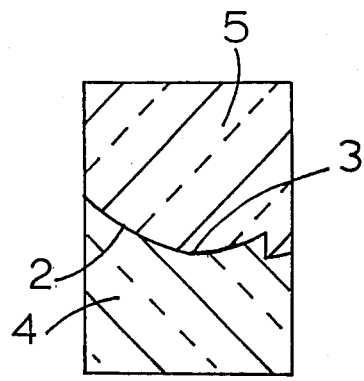
FIG. 6 shows the resinous negative mold and the solid bifocal lens material removed from the silicone sleeve.
Figure 8:
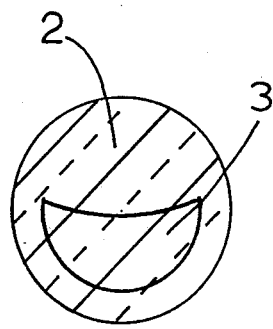
FIG. 8 shows the bifocal lens from the front.

The concave resinous mold 4 FIG. 5 is placed in a silicone sleeve 6 FIG. 5. The concave optical surfaces 2 FIG. 5 and 3 FIG. 5 are covered with a liquid lens monomer 5 FIG. 5. The liquid lens monomer 5 FIG. 5 is allowed to polymerize and form a transparent solid having the convex image of the concave optical surface 2 and 3 FIG. 5. The resinous concave mold 4 FIG. 6 and the solid lens material 5 FIG. 6 are removed from the silicone rubber sleeve 6 FIG. 5. A concave optical surface 7 FIG. 7 is cut and polished on the lens material 5 FIG. 7. The prism cut into surface 2 FIG. 7 provides a thin lens apex 9 FIG. 7 and a thick lens base 8 FIG. 7. Prism is necessary to provide ballast and position the reading segment 3 FIGS. 7 and 8 at the lower lens edge. The bifocal lens 2 FIG. 8 is removed from the resinous concave mold 4 FIG. 7. The crescent shaped segment 3 FIG. 8 has a positive refractive power.

For the production of soft hydrogel bifocal contact lenses the following monomer formulations have been found useful:

| | |
|---|---|
| (1) Ethylene glycol monomethacrylate | 81.9% |
| Diethylene glycol monomethacrylate | 17.2% |
| Diethylene glycol dimethacrylate | 0.6% |
| Benzoyl Peroxide | .3% |
| (2) Ethylene glycol monomethacrylate | 81.9% |
| Diethylene glycol monomethacrylate | 17.2% |
| Diethylene glycol dimethacrylate | 0.6% |
| 2,2'-Azobis[2-methylpropionitrile] | .3% |
| (3) Ethylene glycol monomethacrylate | 93.6% |
| Methacrylic acid | 6.0% |
| Diethylene glycol dimethacrylate | 0.6% |
| t-Butyl peroxbenzoate | .25% |

The hard xerogel lens 5 FIG. 7 is removed from the resinous mold 4 FIG. 7 and hydrated to form a soft hydrogel bifocal contact lens. The bifocal lenses are reproducible as many identical resinous concave molds 4 FIG. 4 can be made from the metal convex mold 1 FIG. 4.

A second convex resinous mold having the convex radius 7 FIG. 7 may be placed in the silicone rubber sleeve 6 FIG. 5 and provide the radius 7 FIG. 7 by molding. In this manner the lens is completely cast molded.

It is understood that the invention is not limited to the exact details of construction shown and described herein for obvious modifications will occur to persons skilled in the art.

I claim:

1. A method of molding a bifocal contact lens having a crescent shaped reading segment made by the steps of providing a metal convex mold member, cutting the shorter radius near focusing convex optical surface in the central area of the metal convex mold, cutting a longer radius convex distant focusing optical surface having from 0.25 to 3.5 prism diopters and positioned to intersect the near focusing segment forming a crescent shaped shorter radius near focusing segment, placing the convex metal bifocal mold in a metal cylinder and applying a heated and softened resinous material to the convex metal bifocal mold surface, allowing the heated and softened plastic resinous material to assume the shape of the metal convex bifocal mold, allowing the heated and softened resinous material to cool and form a solid concave image of the convex material bifocal mold, placing the solid concave bifocal resinous mold in a silicone rubber sleeve and covering the concave bifocal resinous mold with a transparent liquid lens monomer allowing the liquid lens monomer to polymerize to form a solid transparent convex replica of the concave resinous bifocal mold, removing the concave resinous bifocal mold and the transparent lens material from the silicone rubber sleeve and cutting a concave optical surface on the lens material to form a bifocal lens, removing the bifocal lens from the concave resinous mold.

2. A method of molding a bifocal contact lens having a crescent shaped reading segment made by the steps of providing a metal convex mold member, cutting the shorter radius near focusing convex optical surface in the central area of the metal convex mold, cutting a longer radius convex distant focusing optical surface positioned to intersect the near focusing segment forming a crescent shaped shorter radius near focusing segment, applying a heated and softened resinous material to the convex metal bifocal mold surface, allowing the heated and softened plastic resinous material to assume the shape of the metal convex bifocal mold, allowing the heated and softened resinous material to cool and form a solid concave image of the convex metal bifocal mold, covering the concave bifocal resinous mold with a transparent liquid lens monomer allowing the liquid lens monomer to polymerize to form a solid transparent convex image of the concave resinous bifocal mold, cutting a concave optical surface on the lens material to form a bifocal lens, removing the bifocal lens from the concave resinous mold.

3. A method of molding a bifocal hydrogel contact lens having a crescent shaped reading segment made by the steps of providing a metal convex mold member, cutting the shorter radius near focusing convex optical surface in the central area of the metal convex mold, cutting a longer radius convex distant focusing optical surface positioned to intersect the near focusing segment to form a crescent shaped shorter radius near focusing segment, applying a heated and softened resinous material to the convex metal bifocal mold surface, allowing the heated and softened plastic resinous material to assume the shape of the metal convex bifocal mold, allowing the heated and softened resinous material to cool and form a solid concave image of the convex metal bifocal mold, covering the concave bifocal resinous mold with a selected transparent liquid lens monomer allowing the liquid lens monomer to polymerize to form a hard xerogel solid transparent convex replica of the concave resinous bifocal mold, cutting a concave optical surface on the xerogel lens material to form a bifocal lens, removing the bifocal xerogel lens from the concave resinous mold, hydrating the hard xerogel bifocal lens to form a soft hydrogel bifocal lens.

4. The subject matter set forth in claim 1 wherein the optical center of the near focusing segment is located at its geometric center.

5. The subject matter set forth in claim 2 wherein the optical center of the near focusing segment is located at its geometric center.

6. The subject matter set forth in claim 3 wherein the optical center of the near focusing segment is located at its geometric center.

7. The subject matter set forth in claim 2 wherein the optical center of the ner and distant focusing segments are displaced one from the other to provide 0.25 to 3.5 diopters of prism refractive power.

8. The subject matter set forth in claim 3 wherein the optical center of the near and distant focusing segments are displaced one from the other to provide 0.25 to 3.5 diopters of prism refractive power.

9. The subject matter set forth in claim 1 wherein the distant focusing metal mold polishing lap is supported around the periphery of the near focusing segment.

10. The subject matter set forth in claim 2 wherein the distant focusing metal mold polishing lap is supported around the periphery of the near focusing segment.

11. The subject matter set forth in claim 3 wherein the distant focusing metal mold polishing lap is supported around the periphery of the near focusing segment.

12. The subject matter set forth in claim 1 wherein the optical center of the near focusing segment is located off its geometric center.

13. The subject matter set forth in claim 2 wherein the optical center of the near focusing segment is located off its geometric center.

14. The subject matter set forth in claim 3 wherein the optical center of the near focusing segment is located off its geometric center.

15. The subject matter set forth in claim 1 wherein a convex optical mold provides the concave lens optical surface.

16. The subject matter set forth in claim 2 wherein a convex optical mold provides the concave lens optical surface.

17. The subject matter set forth in claim 3 wherein a convex optical mold provides the concave lens optical surface.

* * * * *